March 7, 1939. H. BOWLIN 2,149,503
INSECT DESTROYER
Filed Dec. 13, 1937 4 Sheets-Sheet 1

Inventor
Henry Bowlin
By Clarence A. O'Brien
Hyman Berman
Attorneys

Inventor
Henry Bowlin
By Clarence A O'Brien
Hyman Berman
Attorneys

March 7, 1939.  H. BOWLIN  2,149,503
INSECT DESTROYER
Filed Dec. 13, 1937   4 Sheets-Sheet 4

Inventor
Henry Bowlin

By Clarence A. O'Brien
Hyman Berman
Attorneys

Patented Mar. 7, 1939

2,149,503

UNITED STATES PATENT OFFICE 2,149,503

INSECT DESTROYER

Henry Bowlin, Tensha, Tex.

Application December 13, 1937, Serial No. 179,558

2 Claims. (Cl. 43—133)

This invention relates to certain improvements in insect destroyers and particularly to devices of such character that are especially designed and adapted for use in the extermination of boll weevils, grasshoppers, and the like.

An object of the invention is to provide a device of this general character adapted to gather or collect boll weevils, grasshoppers, etc., while lying upon the plants and which insects are caused to pass through a crushing medium.

A further object of the invention is to provide in a device of this character improved means for crushing the insects and also for preventing accumulations of the crushed insects on the machine.

The invention together with its objects and advantages will be best understood from a study of the following description taken in connection with the accompanying drawings wherein:—

Figure 5 is a fragmentary perspective view illustrating certain details hereinafter more fully referred to.

Figure 1:
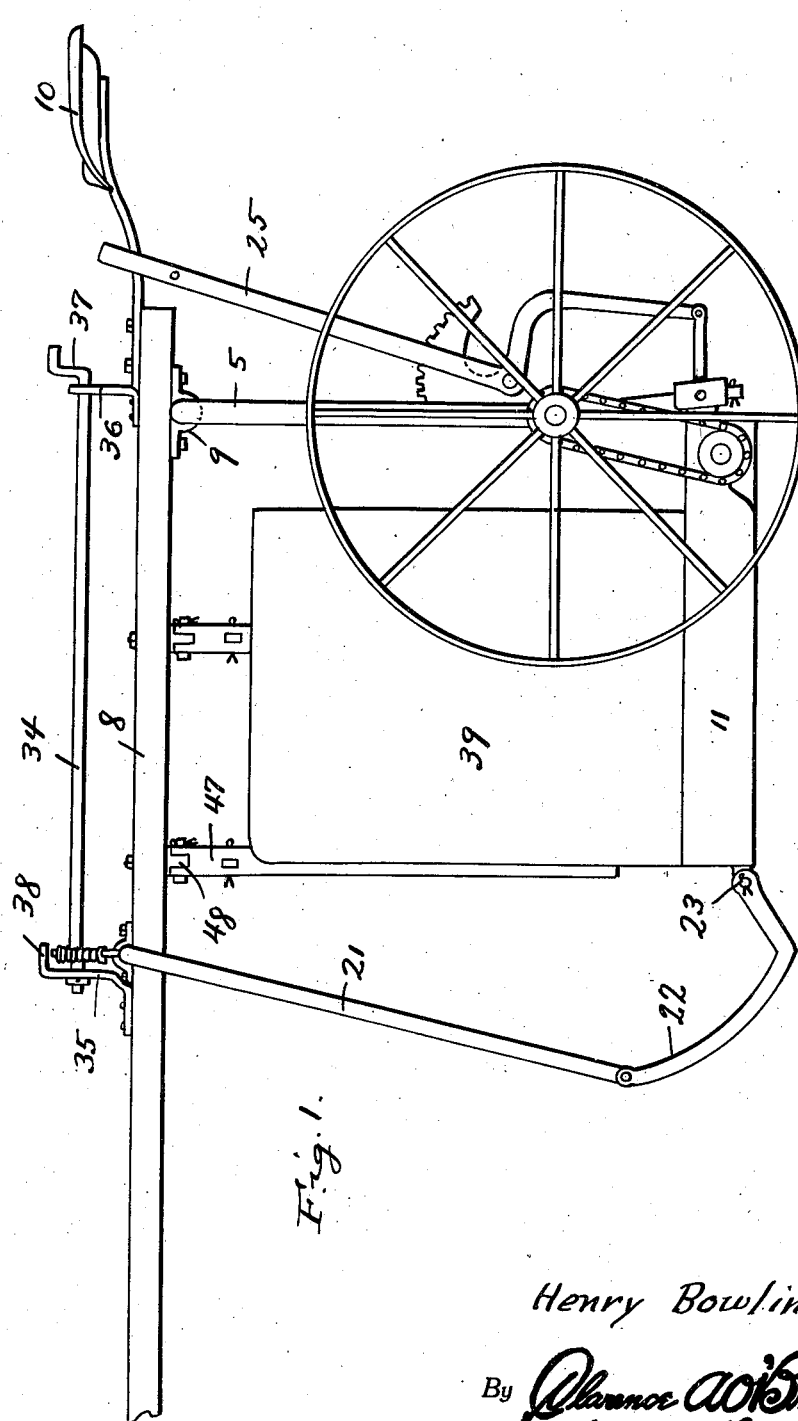
Figure 1 is a side elevational view of the machine.
Figure 2:
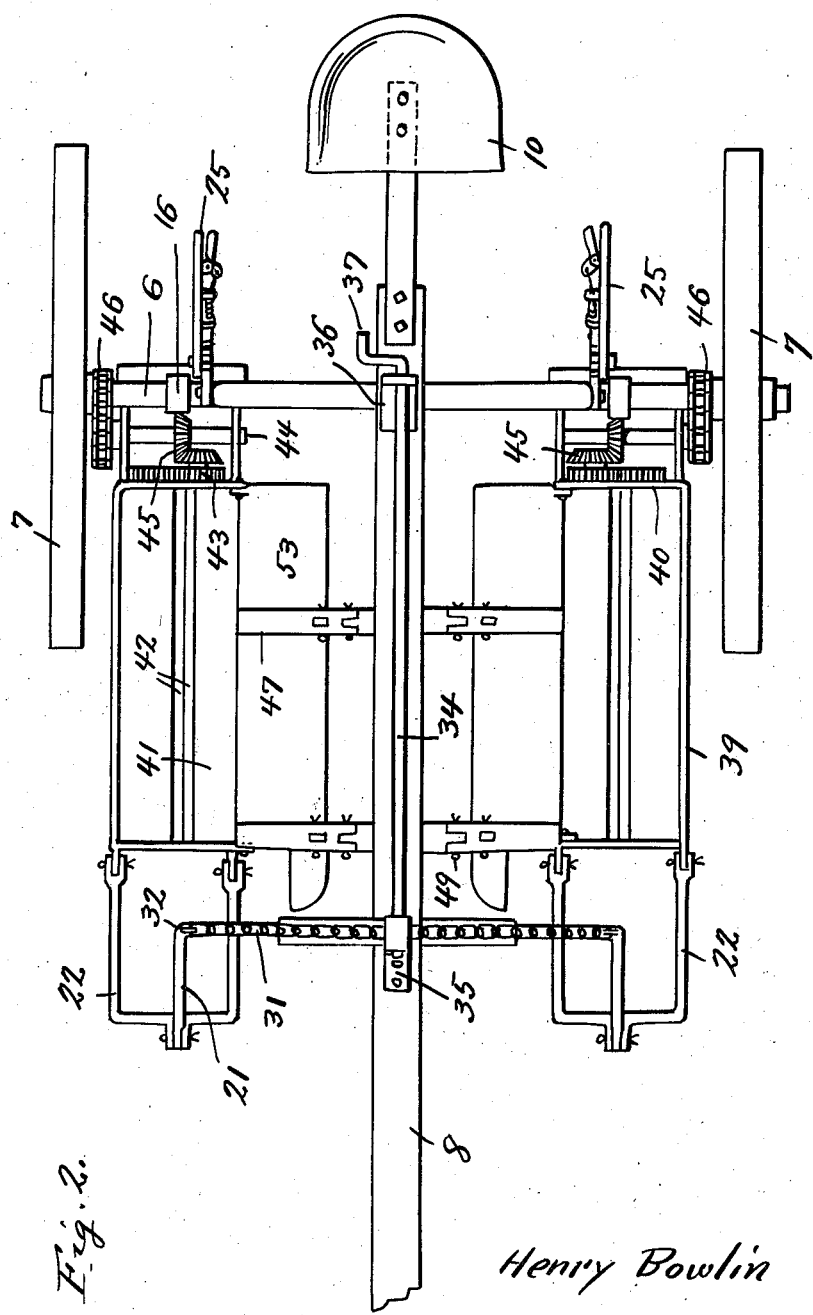
Figure 2 is a top plan view thereof.

Referring to the drawings by reference numerals it will be seen that in the preferred embodiment thereof the insect exterminator or destroyer is in the form of a draft attachment and comprises an arch axle 5 on the ends 6 of which are journaled traction wheels 7.

A draft tongue 8 is secured at its rear end to the axle 5 as at 9, and suitably mounted on the rear end of the draft tongue 8 is a seat 10 for the operator of the machine.

Further the invention comprises a pair of spaced apart insect-receiving and destroying or crushing assemblies 11.

Figure 5:
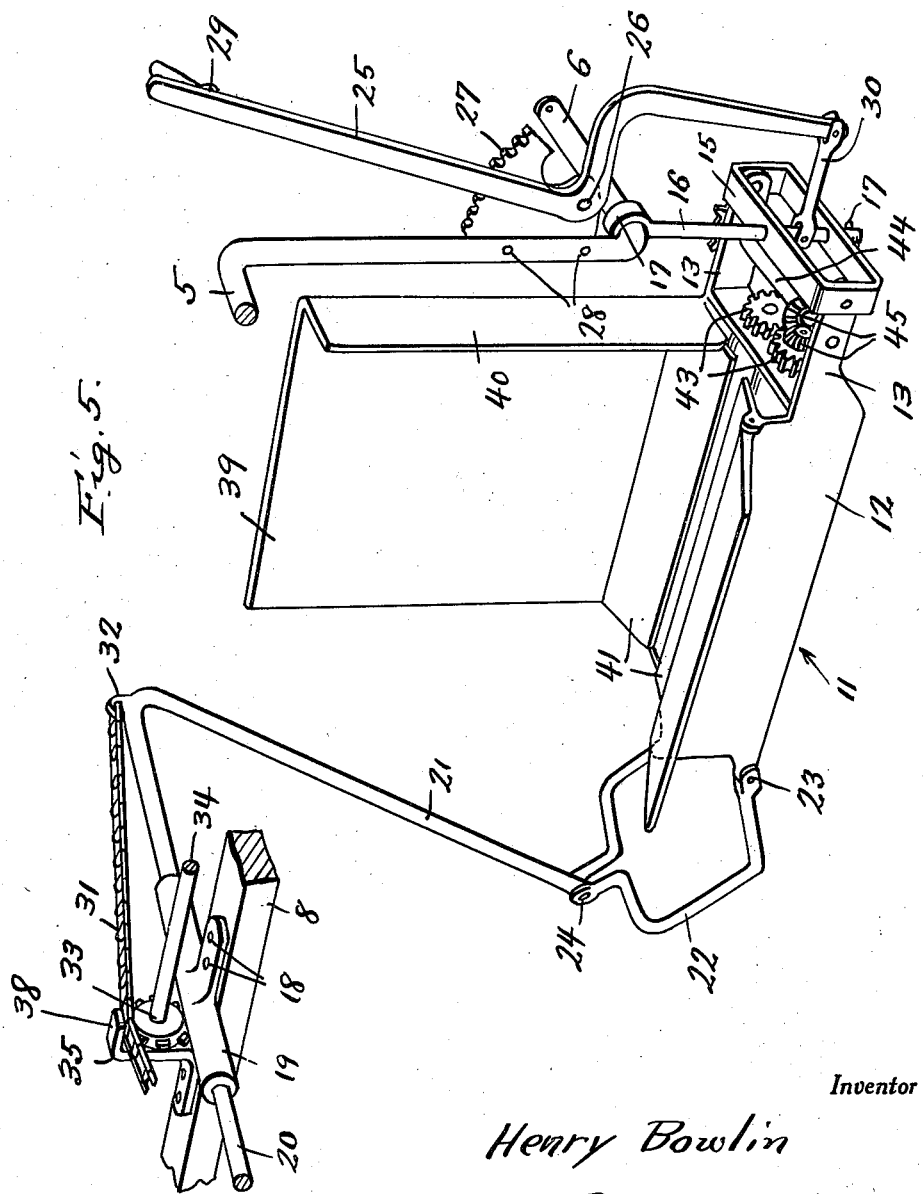

Each of the assemblies 11 comprises a frame-like trough 12 provided at one end with side extensions 13. Extensions 13 at the free ends thereof are pivoted to the opposite end portions of a suspension element 15 that is in the form of a rectangular frame the top and bottom sides of which are apertured to accommodate a suspension rod 16. Rod 16 is provided at the upper end thereof with an eye 17 sleeved on end 6 of the axle 5 as shown in Figure 5, and at the lower end thereof the rod 16 is provided with a cotter pin or other retaining element 17 as shown.

The forward end of each frame 12 is supported in the following manner:—

Suitably fixed as at 18 on an intermediate portion of the draft tongue 8 is a transverse sleeve 19 in which is slidably accommodated a bar 20. At the opposite ends thereof the bar 20 is turned downwardly as at 21 and each end 21 of the bar 20 is connected with the forward end of a frame 12 through the medium of a runner or skid 22. Skid 22 at one end thereof is pivoted to the frame 12 as at 23 and at an opposite end thereof is pivoted to an end 21 of the bar 20 as at 24.

For tilting the frame 12 longitudinally and securing the frame 12 at the desired position of adjustment there is provided therefor an adjusting hand lever 25 which is pivoted as at 26 to a rack segment 27 bolted or otherwise suitably mounted as at 28 on one side of the axle 5. Lever 25 is provided with a detent 29 cooperable with the rack segment 27 for securing the lever 25 at the desired position of adjustment. At the lower end thereof lever 25 which is of the shape shown in Figure 5 is pivotally connected to the suspension rod 16 through the medium of a link 30. It will thus be seen that by rocking the lever 25 in the desired direction suspension rod 16 will be caused to swing about the axle end 6 as an axis in a manner to adjust the frame 12 relative to ground level.

It will be further appreciated that the hanger frames 15 are rotatable about the hanger bars 16 as axes so that the frames 12 of the devices 11 may be swung either to the right or left as may be found desirable.

The swinging of the assemblies 11 to the right or left is accomplished by sliding the bar 20 through the sleeve 19 in the proper direction.

For sliding the bar 20 in the desired direction there is provided a chain 31 which at its opposite ends is secured to the bar 20 as at 32.

The chain 31 is trained over a sprocket wheel 33 provided on one end of a longitudinally extending shaft 34.

The shaft 34 has one end thereof journaled in a suitable bearing extension 35 associated with the guide sleeve 19 and a second end thereof journaled in a suitable bearing bracket 36 rising from the draft tongue 8 adjacent the rear end of the draft tongue. At the last named end thereof the shaft 34 is provided with a crank 37 within convenient reach of the occupant of seat 10.

The bearing bracket 35 is provided with an inwardly directed lug 38 which serves to maintain the chain 31 in engagement with the sprocket wheel 33.

From the foregoing it will be seen that by rotating the shaft 34 in the desired direction rod 20 will be caused to slide through the sleeve 19 either to the right or left as the case may be thus causing the frames 12 of the devices 11 to swing about the rods 16 as a pivot either to the right or to the left.

The frame 12 of each of the assemblies 11 on the outer side thereof is provided with a vertical upstanding shield 39 which at the rear edge thereof is provided with a lateral inwardly extending extension 40.

Also the frame 12 has sloping inwardly from opposite sides thereof ledge plates 41 which serve to direct the insects, brushed from the plants in a manner hereinafter more fully disclosed, between crushing rollers 42 arranged in pairs and journaled within the respective frames 12.

At one end thereof the shafts of the crushing rollers 42 are operatively connected together through the medium of gearing 43, and one roller of each pair of rollers 42 is driven from a shaft 44 supported between the frame extensions 13, through the medium of gearing 45.

Each shaft 44 is driven from a traction wheel 7 through the medium of a chain and sprocket mechanism 46.

It will thus be seen that as the insects are directed into the frames 12 of the devices 11 the insects are crushed between the coacting rollers 42 with which each assembly 11 is equipped.

Obviously the crushed insects passing from between the pairs of rollers 42 pass entirely through the respective frames 12 onto the ground with the result that there will be no accumulation of crushed insects on the machine.

For brushing the insects from the plants and into the troughs or frames 12 of the assemblies 11 there are provided brushes 47 which are arranged in pairs and are suspended at a desired incline, or at an angle to the perpendicular from the draft tongue 8 through the medium of cross bars 48 secured to the draft tongue, and pivoted to the ends of the cross-bars 48 as at 49 are the upper ends of the heads of the brushes 47. The brushes 47 are arranged in pairs with the brushes of each pair of arranged in synclinal relation as shown in Figure 3 so as to accommodate the plants therebetween.

Figure 3:
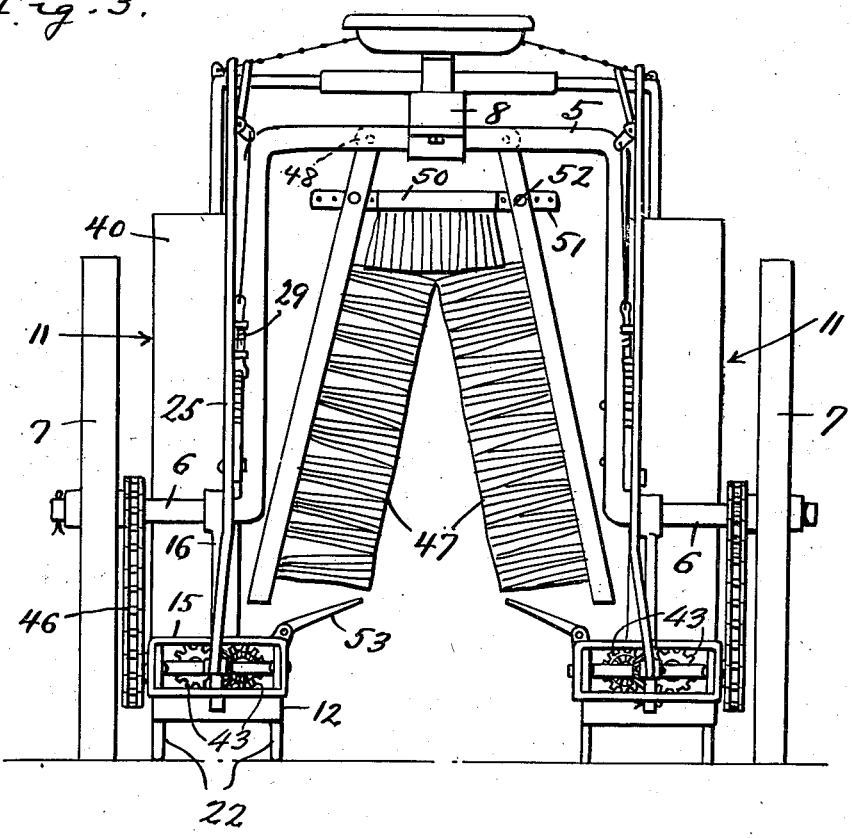
Figure 3 is a rear elevational view of the machine.
Figure 4:
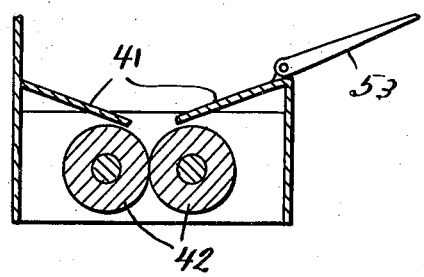
Figure 4 is a fragmentary transverse sectional view through a crushing device.

Also associated with each pair of brushes 47 is a horizontal brush 50 disposed adjacent the upper ends of the brushes 47 and each brush 50 has the head thereof provided with apertured end extensions 51 through the medium of which and pins 52 each brush 50 is supported in operative position to its pair of brushes 47 and the brushes 47 of each pair are secured at the desired position of angular adjustment as will be clear from a study of Figure 3.

As is thought to be apparent, in actual practice the machine is attached to a suitable draft animal or vehicle to be drawn thereby. As the exterminator moves over the ground the plants are straddled by the brushes 47 so that brushes 47 and 50 will have wiping engagement with the plants in a manner to brush the boll weevils and other insects therefrom, the brushed insects being directed, as previously described, into the troughs or frames 12 to be crushed by the rollers 42 arranged within the frames 12.

To insure the directing of the brushed insects into the frames or troughs 12 each frame or trough 12 at the inner side thereof is provided with an inclined catch board 53. The boards 53 extend inwardly beneath the lower ends of the brushes 47 as clearly shown in Figure 3 to insure the directing of the insects into the troughs or frames 12.

It will also be apparent that by manipulating the levers 25 the frames 12 may be moved to the desired position of vertical adjustment, and by operating the rods 16 the assemblies 11 may be swung either to the right or left as found desirable.

It is thought that a clear understanding of the construction, utility, advantages and manner of operation of an invention of this character will be had without a more detailed description.

Having thus described the invention what is claimed as new is:

1. In an apparatus of the character described, a wheeled vehicle, a pair of opposed frames, means suspending said frames from the vehicle including means for raising and lowering the frames for securing the frames at the desired position of adjustment, and also including means for swinging the frames laterally toward the right or left, said frames being open at the top and bottom thereof, coacting crushing rolls mounted in the frames for crushing insects directed into the frames, horizontal transverse brushes mounted on the vehicle, side brushes depending from the vehicle adjacent the inner sides of said frames, interengaging means on the first and second mentioned brushes for securing the second mentioned brushes at the desired angle of inclination relative to the perpendicular, said brushes being arranged for wiping engagement with plants for brushing insects from the plants into said frames.

2. An insect destroyer comprising a portable supporting structure including ground wheels, parallel spaced frames pivotally and slidably mounted on said structure to permit the frames to be swung horizontally in either direction and adjusted towards and from the ground, insect crushing means located in said frames, means on said structure for directing insects into said frames, means for driving said crushing means from the ground wheels, a hand actuated means for the adjustment of said frames vertically, a bar slidably mounted on said supporting structure, skids pivoted on said frames and on the ends of said bar, a sprocket chain connected to said bar adjacent opposite ends thereof, a sprocket gear in mesh with the sprocket chain, and a hand actuated means connected to the sprocket gear for the adjustment of the bar in opposite directions to bring about swinging of the frames horizontally in opposite directions.

HENRY BOWLIN.